(No Model.)

A. R. GLOVER.
WATER GATE.

No. 341,471. Patented May 11, 1886.

Witnesses:
David Hufford
Albert Johnson

Inventor:
Alfred R. Glover

UNITED STATES PATENT OFFICE.

ALFRED R. GLOVER, OF CLAYTON, INDIANA.

WATER-GATE.

SPECIFICATION forming part of Letters Patent No. 341,471, dated May 11, 1886.

Application filed November 27, 1885. Serial No. 184,090. (No model.)

*To all whom it may concern:*

Be it known that I, ALFRED R. GLOVER, a citizen of the United States, residing at Clayton, in the county of Hendricks and State of Indiana, have invented a new and useful Water-Gate, of which the following is a specification.

My invention relates to the construction of a water-gate so that it shall be self-adjusting, and effectually prevent the collection of drift-wood or other obstructions on the gate, and at all stages of the water be a complete protection against stock passing through. I attain these objects by the mechanism illustrated in the accompanying drawings, in which—

Figure 1:
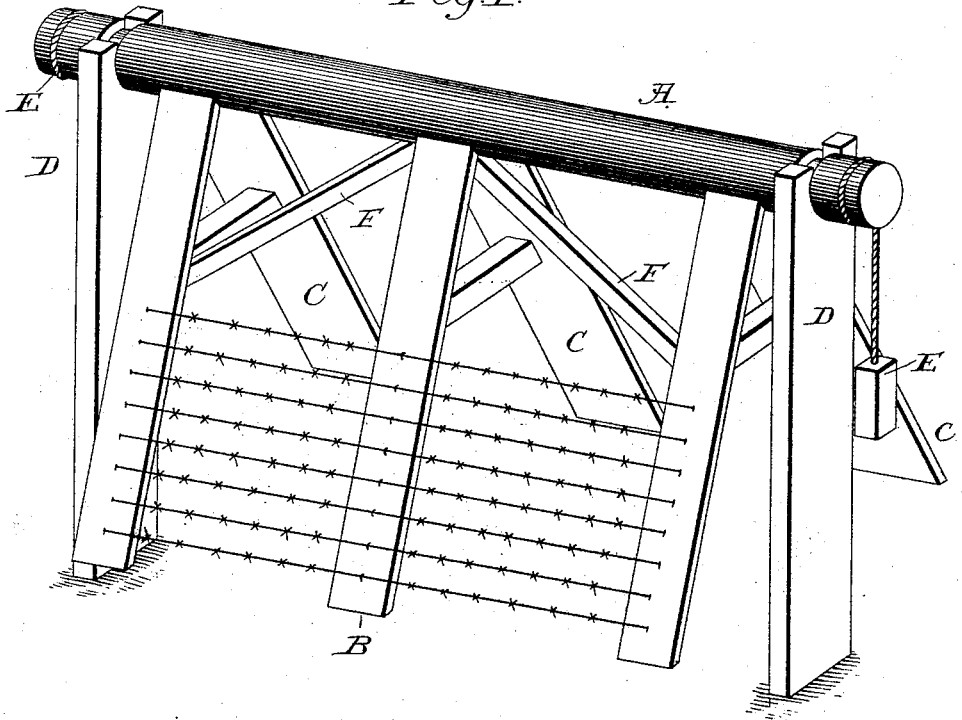
Figure 2:
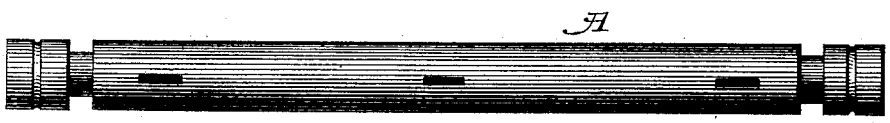

Figure 1 is a perspective view of my invention, and Fig. 2 a detail view of the roller.

My gate is made of timber.

The beam or roller shown in the drawings, and marked A, is of sufficient length to reach across the stream, and strong enough to sustain the weight of the gate and prevent it from sagging, and for broad streams to be spliced and have suspension-braces. Near each end a journal is formed, to be set in the posts or supports hereinafter named. Between the journal and end of the roller a groove is formed, in which a cord or chain is placed, to which the weights hereinafter named are attached to assist in turning the gate.

Into the beam or roller are inserted scantling or studding of sufficient length and number to form the fence part, across which barbed wires are stretched to complete the fence. These timbers are securely braced to sustain the tension of the wire. This part of the gate is shown on the drawings as B. The floats or oars shown on the drawings, and marked C, are also inserted in mortises in the roller or beam A, and are formed of boards or planks about two inches thick and ten to twelve inches wide, well secured and braced, and a sufficient number used for the pressure of water on the lower end to cause the gate to revolve sufficiently to raise the fence out of the way of drift-wood.

Posts or supports for the gate are set on both sides of the stream. The journals on the roller A are placed in notches on top of these posts, and weights attached to the ropes or chains passing over the grooves near the ends.

The gate when erected is so placed that the floats and fence portions shall rest on or near the ground at low water, but so that the floats or oars will not touch the ground when the gate revolves. The fence portion and floats are inserted at an angle of about fifty degrees from each other.

What I claim as my invention, and desire to secure by Letters Patent, is—

The combination of the posts D, the roller A, provided with reduced portions at the ends and journaled in said posts, the timbers B, secured in oblique positions to one side of the roller in mortises, the barbed wires crossing said timbers B, the floats or oars C, secured in mortises in like positions on the other side thereof at an angle of about fifty degrees from the timbers B, the braces F, and the weights E, connected to the ends of the roller A by cords or chains.

ALFRED R. GLOVER.

Witnesses:
WM. H. CALVERT,
J. G. MILES.